US008954892B2

(12) United States Patent
Das et al.

(10) Patent No.: US 8,954,892 B2
(45) Date of Patent: Feb. 10, 2015

(54) FLEXIBLE REPORTING ON STORAGE RESOURCES

(75) Inventors: Ashutosh Das, Santa Clara, CA (US); Greg L Pelts, Santa Clara, CA (US); Sanjeev Sahu, Santa Clara, CA (US)

(73) Assignee: Hitachi Data Systems Corporation, Santa Clara, CA (US)

( * ) Notice: Subject to any disclaimer, the term of this patent is extended or adjusted under 35 U.S.C. 154(b) by 1395 days.

(21) Appl. No.: 12/500,266

(22) Filed: Jul. 9, 2009

(65) Prior Publication Data
US 2011/0010664 A1    Jan. 13, 2011

(51) Int. Cl.
G06F 3/048 (2013.01)
G06F 11/32 (2006.01)
G06F 11/34 (2006.01)

(52) U.S. Cl.
CPC ............ *G06F 11/32* (2013.01); *G06F 11/3485* (2013.01)
USPC .......................................... 715/853; 715/810

(58) Field of Classification Search
USPC ................................................. 715/810, 853
See application file for complete search history.

(56) References Cited

U.S. PATENT DOCUMENTS

| 5,491,810 | A | 2/1996 | Allen | |
|---|---|---|---|---|
| 6,636,250 | B1 * | 10/2003 | Gasser | 715/853 |
| 6,957,186 | B1 | 10/2005 | Guheen et al. | |
| 7,403,987 | B1 * | 7/2008 | Marinelli et al. | 709/223 |
| 7,873,619 | B1 | 1/2011 | Faibish et al. | |
| 7,966,078 | B2 | 6/2011 | Hoffberg et al. | |
| 2002/0120741 | A1 | 8/2002 | Webb et al. | |
| 2002/0152305 | A1 | 10/2002 | Jackson et al. | |
| 2003/0110188 | A1 * | 6/2003 | Howard et al. | 707/200 |
| 2003/0158920 | A1 * | 8/2003 | Lynch et al. | 709/220 |
| 2004/0193621 | A1 * | 9/2004 | Moore et al. | 707/100 |
| 2005/0066293 | A1 * | 3/2005 | Hunt | 715/854 |
| 2005/0071765 | A1 * | 3/2005 | Hallisey et al. | 715/734 |
| 2005/0235054 | A1 | 10/2005 | Kadashevich | |
| 2006/0276995 | A1 | 12/2006 | Breitgand et al. | |
| 2007/0143712 | A1 | 6/2007 | Baran | |
| 2007/0260625 | A1 * | 11/2007 | Tien et al. | 707/101 |
| 2007/0294672 | A1 * | 12/2007 | Mosuoka | 717/126 |
| 2011/0010445 | A1 | 1/2011 | Das et al. | |
| 2014/0208227 | A1 * | 7/2014 | Mccann et al. | 715/752 |

* cited by examiner

*Primary Examiner* — Anil Bhargava
(74) *Attorney, Agent, or Firm* — Mattingly & Malur, PC

(57) ABSTRACT

A method for providing flexible reporting for applications which utilize storage in at least one storage system comprises presenting a plurality of business views which aggregate application storage characteristics for a plurality of applications according to a reporting structure which is defined by a user, each of the business views being a hierarchical folder structure of the applications and a plurality of folders, wherein at least one folder in the hierarchical folder structure contains at least one of an application or another folder; for each of the business views, presenting the applications and folders as a plurality of nodes which are selectable by the user; and in response to a selection of one of the nodes from the plurality of business views and a report type specified by the user, generating a report based on the report type of the selected node, the report aggregating any of the application storage characteristics for the selected node according to the report type.

24 Claims, 10 Drawing Sheets

| PORT | LUN | LDEV |
|---|---|---|
| 31:02:c2:60:35:01 | 0 | 1 |
| | 1 | 2 |
| | ⋮ | ⋮ |
| | k | m |
| 31:02:c2:60:35:02 | ⋮ | ⋮ |
| 31:02:c2:60:35:03 | ⋮ | ⋮ |

FIG. 4

FLEXIBLE REPORTING ON STORAGE RESOURCES

RELATED APPLICATIONS

The present application is related to concurrently filed U.S. patent application Ser. No. 12/500,189, (Modeling Computer Applications and Storage Used Thereby) and Ser. No. 12/500,252 (Monitoring Application Service Level Objectives), the entire disclosures of which are incorporated herein by reference.

BACKGROUND OF THE INVENTION

The present invention relates generally to storage utilization by computer applications and, more particularly, to modeling the applications and storage used thereby, monitoring application service level objectives, and flexible reporting on storage resources.

An important aspect of managing a computer system involves managing the storage utilized in the computer system. IT (Information Technology) organizations spend a considerable amount of time and effort to develop tracking processes to correlate storage resources back to the respective business applications that rely on them. Without accurate storage reporting, there are no assurances that storage service levels are being met and proper storage planning is extremely challenging. A wide range of storage management statistics is required for complete storage reporting, including storage system configurations, application and storage performance statistics, applicable storage paths, and the like. Usually this information is collected and stored across several storage management tools without an easy way to combine and analyze all relevant information in an integrated fashion.

Most reports on storage capacity and performance have well-known predefined attributes (otherwise known as columns). Many reporting tools allow the generation of custom reports by selecting only the columns and rows of interest. However, these reports typically apply to storage in general rather than to storage used by specific applications or business entities such as departments or data centers utilizing those applications. The tools that allow reporting on the storage used by applications or business entities require a definition of hard-coded custom reports or storage labeling schemes (i.e., attaching a description to each LDEV which follows a company convention). When the company organization or reporting requirements change, a significant effort is needed to change these custom reporting schemes on storage capacity.

BRIEF SUMMARY OF THE INVENTION

Exemplary embodiments of the invention provide a technique to model applications and storage used thereby, to monitor application service level objectives, and to integrate, monitor, and report on key management statistics of storage resources to provide a comprehensive business view into the operation and management of the storage environment of a computer system.

Traditionally the storage allocated to an application running on a host is typically not tracked. In the best-case scenario, it is tracked in a haphazard fashion through a combination of spreadsheets, paper notes, and software constructs which do not explicitly model that application. As a result, there are many reports on the performance and capacity of storage without any correlation of how the storage performance impacts the performance of the application. However, it is the application's performance that is most important to its users. For example, sometimes poorly performing storage does not negatively impact the performance of applications using that storage. Similarly, optimal storage performance does not guarantee fast application response times and a good user experience.

There are various products such as HTnM and Aptare's Capacity Reporter which report on an application's storage capacity. However, none of them represent the application as a distinct logical object and manage its storage. One feature of this invention is to model the actual application running on a host as an application object. The storage (e.g., LDEVs) used by the actual application can be tracked in the storage management scheme of the invention by associating them with the application object. The application object's storage can be assigned manually or imported from storage groups of a device manager in the computer system (e.g., HDvM), and enables reporting on the storage capacity used by the actual application.

There are various products such as HTnM which measure storage performance and troubleshoot storage issues. However, none of them provide a clear way of measuring whether storage performance is delivering sufficient service required by a specific application. Another feature of the invention is to model the actual application running on a host as an application object which keeps track of all storage (e.g., LDEVs) used by the actual application, and to enable defining service level objects (SLOs) which an application's storage needs to meet in order for the application to provide the desired user experience. These SLOs are threshold specific to an application and are measured based on the characteristics of storage assigned to that application. The concept of modeling application SLOs allows a quantitative evaluation of the service application storage is delivering.

There are various products such ash HTnM and Aptare's Capacity Reporter which report on an application's storage capacity. Some OLAP (OnLine Analytical Processing) products require the definition of a "reporting model" which is used to actually generate and aggregate reports (note that OLAP products are not used to report on storage utilization). However, no products use separately defined custom hierarchical structures defined at run-time for aggregating pre-defined report data. Another feature of the invention is to allow the storage administrator to define quickly and easily multiple business views which mirror the company's organization and reporting needs. These business views aggregate application storage capacity and other characteristics according to the company's reporting structure. The business views are easily defined and modified. Their key benefit is that they embody the criteria according to which storage capacity and other reports are aggregated, thus separating aggregation criteria from the reports and enabling the same reports to be used with any custom organizational reporting structure.

An aspect of the present invention is directed to a computer system which includes at least one host computer and at least one storage system which are connected via a network, the at least one host having one or more applications running thereon. A method for providing flexible reporting for applications which utilize storage in the at least one storage system comprises presenting a plurality of business views which aggregate application storage characteristics for a plurality of applications according to a reporting structure which is defined by a user, each of the business views being a hierarchical folder structure of the applications and a plurality of folders, wherein at least one folder in the hierarchical folder structure contains at least one of an application or another folder; for each of the business views, presenting the applications and folders as a plurality of nodes which are selectable by the user; and in response to a selection of one of the nodes from the plurality of business views and a report type specified by the user, generating a report based on the report type of the selected node, the report aggregating any of the application storage characteristics for the selected node according to the report type.

In some embodiments, the application storage characteristics include at least one of application storage capacity utilization, application storage performance, application storage I/O bandwidth usage, application storage service level objective (SLO) fulfillment, or application SLO fulfillment trend. The business views include folders that belong to at least one of categories of geographical locations of data center, departments of an organization, or application types. Each of the applications contains the storage used thereby.

In specific embodiments, the method further comprises presenting a list of available report types to the user for the user to select the report type for the report to be generated. The available report types are customizable by the user. The available report types are designed to provide information for at least one of chargeback for storage usage, reallocation of storage, or storage planning.

Another aspect of the invention is directed to a computer system including at least one host computer and at least one storage system which are connected via a network, the at least one host having one or more applications running thereon and utilizing storage in the at least one storage system. The computer system further includes a flexible reporting module which presents a plurality of business views which aggregate application storage characteristics for a plurality of applications according to a reporting structure which is defined by a user, each of the business views being a hierarchical folder structure of the applications and a plurality of folders, wherein at least one folder in the hierarchical folder structure contains at least one of an application or another folder; for each of the business views, presents the applications and folders as a plurality of nodes which are selectable by the user; and in response to a selection of one of the nodes from the plurality of business views and a report type specified by the user, generates a report based on the report type of the selected node, the report aggregating any of the application storage characteristics for the selected node according to the report type.

Another aspect of the invention is directed to a computer-readable storage medium storing a plurality of instructions for controlling a data processor to provide flexible reporting for applications running on a host computer and utilizing storage. The plurality of instructions comprise instructions that cause the data processor to present a plurality of business views which aggregate application storage characteristics for a plurality of applications according to a reporting structure which is defined by a user, each of the business views being a hierarchical folder structure of the applications and a plurality of folders, wherein at least one folder in the hierarchical folder structure contains at least one of an application or another folder; instructions that, for each of the business views, present the applications and folders as a plurality of nodes which are selectable by the user; and instructions that, in response to a selection of one of the nodes from the plurality of business views and a report type specified by the user, generate a report based on the report type of the selected node, the report aggregating any of the application storage characteristics for the selected node according to the report type.

Various features of the invention provide the user or administrator with the tools to create custom business views of applications with their respective storage groups and resources, to monitor and report on key storage capacity and performance indicators by applications and business entities, to customize reporting of storage I/O performance with historical trends to enable accurate capacity and performance planning, to define storage SLOs for critical business applications, such as allocated capacity, maximum logical device (LDEV) response time and average LDEV response time, and to report and provide alerts on application-based storage SLOs and overall storage system health.

These and other features and advantages of the present invention will become apparent to those of ordinary skill in the art in view of the following detailed description of the specific embodiments.

BRIEF DESCRIPTION OF THE DRAWINGS

FIG. 4 illustrates a LU mapping table maintained by the storage system.

DETAILED DESCRIPTION OF THE INVENTION

Figure 1:
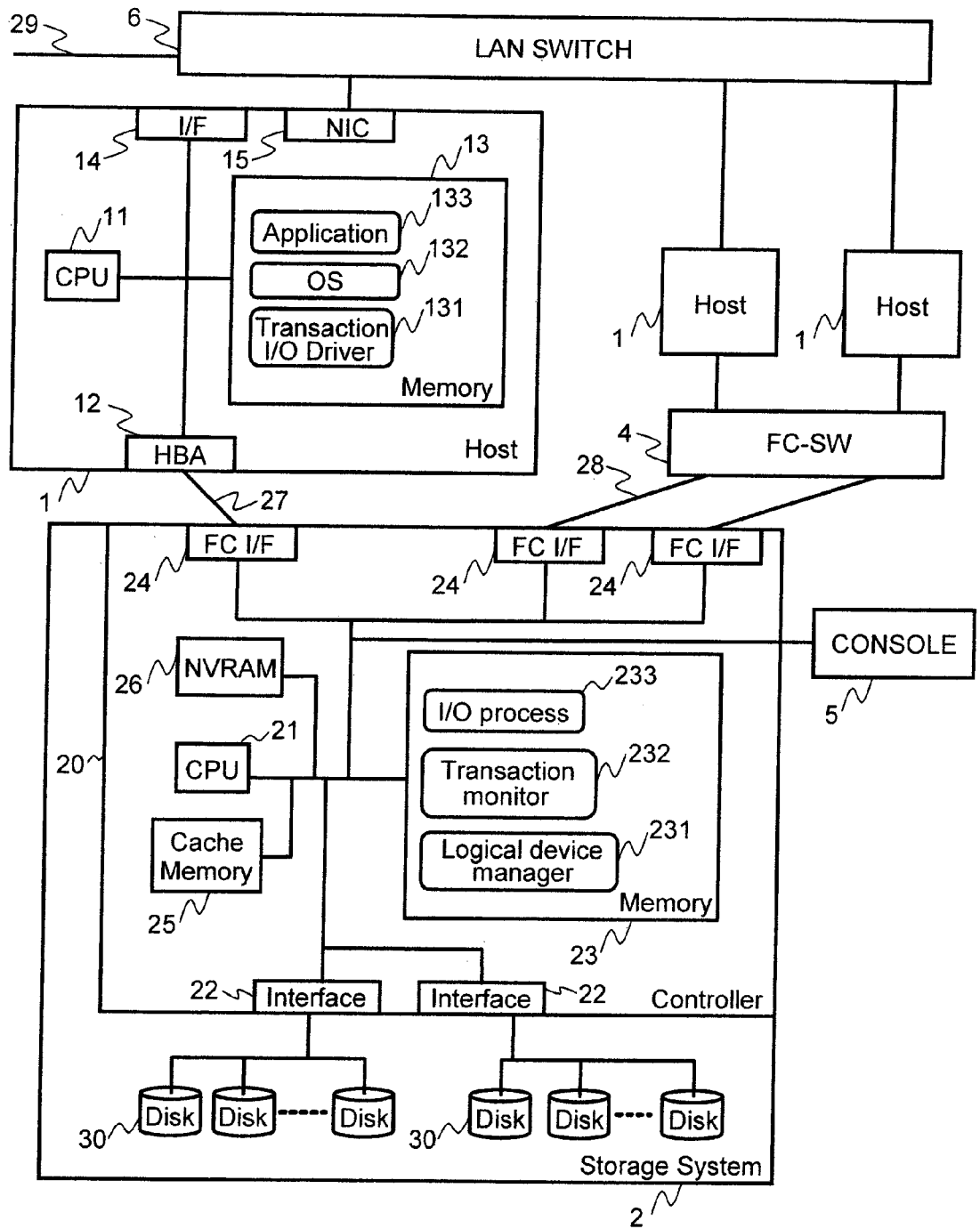
FIG. 1 illustrates an example of a hardware configuration of a computer system in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment", "this embodiment", or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing", "computing", "calculating", "determining", "displaying", or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for a technique to model applications and storage used thereby, to monitor application service level objectives, and to integrate, monitor, and report on key management statistics of storage resources to provide a comprehensive business view into the operation and management of the storage environment of a computer system.

A. System Configuration & Functional Diagram

FIG. 1 illustrates an example of the system in which the method and apparatus of this invention may be applied. The system includes one or more host computers 1 (hereinafter referred to as "host 1"), and a storage system 2. The hosts 1 may be connected for communication with the storage system 2 via a direct connection 27 or via a Fibre Channel (FC) switch (FC-SW) 4 as part of a storage area network 28. Further, the hosts 1 may be able to communicate with each other via a local area network (LAN) 29 including a LAN switch 6. The physical interface of the LAN switch 6 is Ethernet in this embodiment, but may be other types of networking protocols as well.

The host 1 may be a PC/AT compatible computer or workstation that runs a UNIX® or Windows® operating system. In another embodiment, the host 1 may be a mainframe computer running IBM's OS/390® or z/OS® operating systems. The host 1 includes at least a CPU 11, a memory 13, a Network Interface Controller (NIC) 14, and a HBA (host bus adapter) 12. The host 1 stores and accesses data in the storage system 2 via the HBA 12.

The disk storage system 2 includes a disk controller 20 connected to at least one physical device 30, such as a hard disk drive. The disk controller 20 includes at least a CPU 21, a memory 23, a cache memory 25, a NVRAM (nonvolatile random access memory) 26, one or more Fibre Channel (FC) interfaces 24 and one or more disk interfaces 22. These elements function as follows.

The CPU 21 executes software programs for processing host I/O requests, storing and retrieving data in the physical devices 30, and the like. Details of particular programs relevant to the present invention will be described below.

The memory 23 is a computer readable medium used to store the software programs that are executed by the CPU 21, and is used to store information that is necessary for storing and managing the data stored in the physical devices 30.

The cache memory 25 is used to temporarily store the data that is written from the host 1, or is used to store the data that is read by the host 1 to shorten the response time of the storage system 2 to the host 1. The cache memory 25 may be battery-backed-up memory so that data is preserved even if the storage system 2 fails.

The NVRAM 26 is used for storing boot programs that function when the storage system is initially powered up. When the storage system 2 starts booting, the programs in the NVRAM 26 are loaded into the memory 23 and are executed by the CPU 21.

The FC interface (FC I/F) 24 connects the storage system for communication with the host 1. Alternatively, the FC I/F 24 may be an Ethernet interface or other interface by which the storage system 2 is able to communicate data with the host 1.

The disk interface 22 is used to connect at least one physical device 30 to the controller 20. In the present embodiment, the disk interface 22 (hereinafter called "disk I/F 22") is a Fibre Channel interface, and the physical device 30 is a Fiber Channel disk device that is accessed by the disk controller 20 in accordance with Fibre Channel protocol. In another implementation, the disk I/F 22 can be an ATA interface. In this case, the physical devices 30 that are connected to the disk I/F 22 are ATA (Serial ATA or Parallel ATA) disk devices that are accessed by the disk controller 20 in accordance with ATA protocol.

In this disclosure, several different terms are used when referring to storage devices, such as physical device, logical device, and virtual device.

Physical devices 30 are preferably hard disk drives for storing data, and are FC disk drives in the preferred embodiment, although SATA disk drives or other types of disk drives may also be used. Alternatively, in certain applications, physical devices 30 might be solid state memory, optical disks, or other mass storage device.

Figure 2:
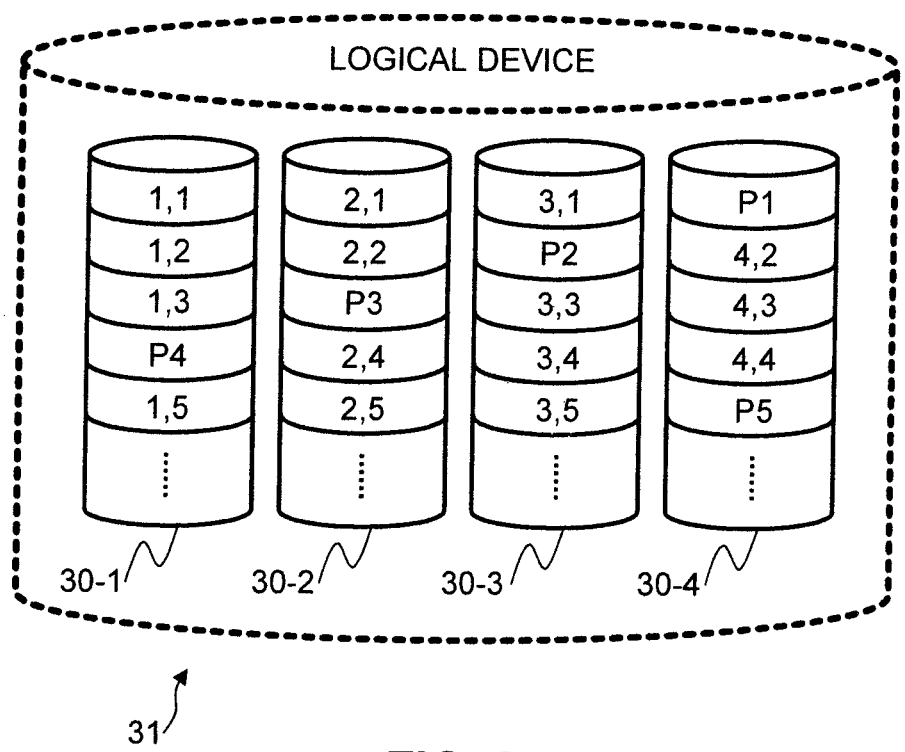
FIG. 2 illustrates an example of how one logical device is created from a plurality of physical devices.

The disk controller 20 constructs at least one logical device using a plurality of physical devices. FIG. 2 illustrates a conceptual diagram of a logical device 31. The logical device 31 in FIG. 2 is composed of four physical devices 30 (disks 30-1, 30-2, 30-3, and 30-4). Each region labeled 1,1; 2,1; etc., is called a "stripe." The regions labeled P1, P2, etc., are called a "parity stripe", which is used for storing the parity data of the corresponding stripes. FIG. 2 illustrates an example in which one logical device 31 is created from a plurality of physical devices 30. In another embodiment, more than one logical device may be defined from a plurality of physical devices, or more than one logical device may be defined from one physical device.

The disk controller 20 constructs at least one virtual device using at least one logical device. The virtual device is constructed to create a snapshot image of a logical device.

Figure 3:
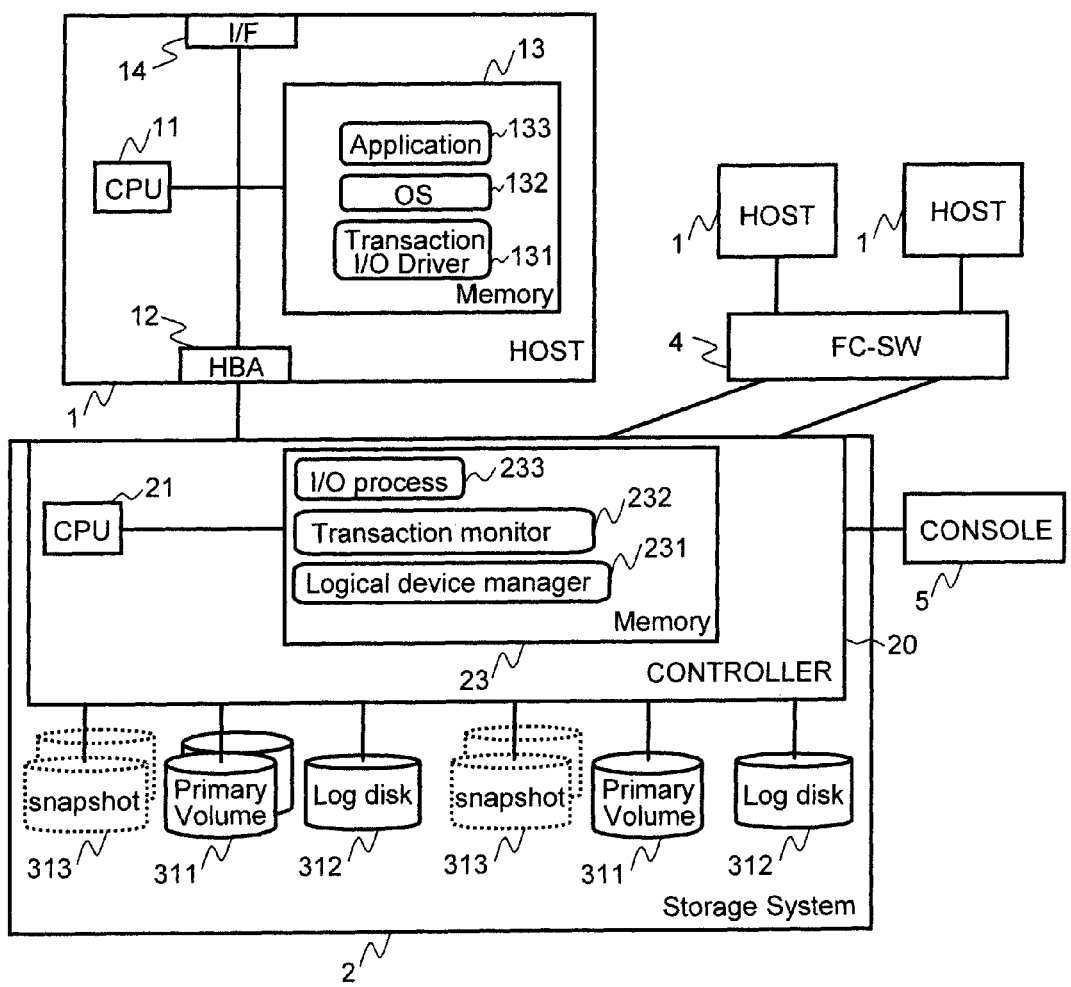
FIG. 3 illustrates a functional diagram of the system illustrated in FIG. 1.

FIG. 3 illustrates a functional diagram of the system illustrated in FIG. 1. In the memories 13 and 23 in the host 1 and the disk controller 20, respectively, there exist multiple software modules for realizing the present invention. The CPU 11 runs these software modules in the host 1 and the CPU 21 runs the software modules in the controller 20. While these software modules are preferably stored in the memories 13 and 23 when executed, they may also be stored wholly or partially on hard disk, optical disk, or other computer readable medium, either locally or remotely. The software modules executed on the host 1 include an application program 133, an operating system 132, and a transaction I/O driver 131. The purpose and function of each of these software modules is as follows.

The application program 133 (hereinafter referred to as "application 133" or "AP 133") is a program such as a relational database management system (RDBMS), World Wide Web server, and the like that runs on host 1 for performing a desired function. The operating system 132: The operating system 132 provides the basic infrastructure to enable AP 133 to be executed.

The transaction I/O driver 131 is a device driver module that is used by the AP 133 when AP 133 handles a transaction. Application programs usually execute operations that include several requests or data updates or other tasks that together make up a discrete unit of work. Each of these discrete units of work may be referred to as a "transaction." Transactions typically are a group of logical operations that must all succeed or fail as a group. Thus, for a transaction to be completed successfully, each task of the multiple tasks forming part of the transaction should be completed successfully. In another embodiment, the transaction I/O driver 131 may be a part of the OS 132. In a further embodiment, the transaction I/O driver 131 may be provided as a dynamic or static link library program so that the AP 133 can link to the transaction I/O driver 131 as needed.

The software modules executed in the controller 20 by the CPU 21 include a logical device manager 231, a transaction monitor 232, and an I/O process 233. The logical device manager 231 defines one or more logical devices (such as the logical device 31 in FIG. 2) from one or more physical devices 30. The logical device manager 231 is also able to create snapshot images of specified logical devices. The transaction monitor 232 operates when the transaction processing instructions are received from the host 1 via the transaction I/O driver 131. The I/O process 233 handles I/O requests from the host 1. When transaction processing instructions are received, the I/O process 233 calls the transaction monitor 232 to handle transaction processing.

Additionally, various types of logical and virtual devices and volumes illustrated in FIG. 3 (primary volume 311, log disk 312, and snapshot volume 313) are used for carrying out the present invention. The primary volume 311 is a logical device that AP 133 uses to store data such as database tables, or the like, depending on the particular function of the AP 133. Further, the AP 133 may use more than one primary volume, or a plurality of application programs 133 may use the same primary volume or volumes. The log disk 312 or log volume is composed of at least one logical device, and is used by the transaction monitor 232. A point-in-time image of the primary volume 311 is stored in the snapshot volume 313. The snapshot volume 313 is used to recover data when a transaction fails. There are a number of prior technologies that describe techniques for creating a snapshot volume, such as local mirroring or copy-on-write snapshot technology. In the present embodiment, the storage system 2 uses a copy-on-write snapshot technique to keep snapshots. Under this technique, at the point when the storage system 2 needs to take a snapshot, the controller 20 creates a virtual device corresponding to the primary volume 311 for storing the snapshot. When any write requests come to the primary volume 311, before updating the region designated with the write request, the data in the region is first stored to an unused logical device. Additional details of the copy-on-write snapshot operation are disclosed, for example, in U.S. Pat. No. 5,649,152, to Ohran et al., the entire disclosure of which is incorporated herein by reference.

Each logical device is managed by logical device manager 231 by assigning a unique identification number to the logical device. This unique identification number is referred to as the "logical device number" (LDEV number). Also, when the host 1 accesses a logical device, it designates a port address and a LUN (Logical Unit Number). Therefore, to enable the host 1 to access logical devices, a set consisting of a port address and a LUN is assigned to each logical device that needs to be accessible from host 1.

FIG. 4 illustrates a LU mapping table 400 that is maintained by the storage system 2. The LU mapping table 400 maintains the combination of a port address (PORT) 401, LUN 402, and LDEV number 403 that correspond to each other. In the present embodiment, as each of the port addresses 401 is associated with one of the FC interfaces 24 in FIG. 1, a World Wide Name (WWN) in the Fibre Channel protocol is assigned to each port address 401. By using LU mapping table 400, when the storage system 2 receives an I/O command designating a port and LUN, the LDEV number of the logical device to be accessed is able to be uniquely determined.

B. Modeline Application and Storage Used Thereby

Figure 5:
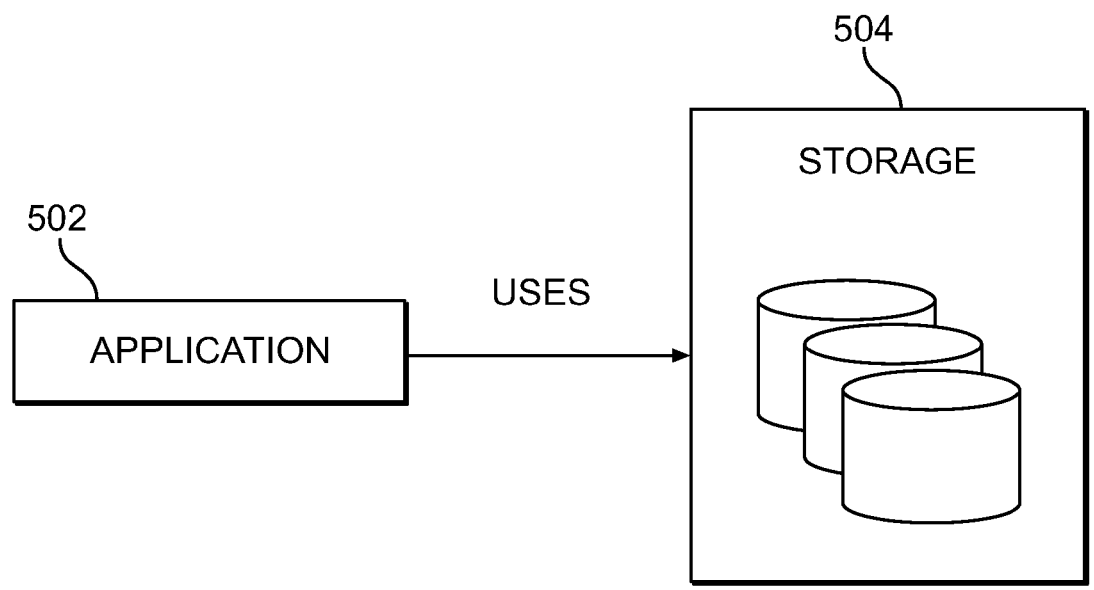
FIG. 5 illustrates an example of an application which utilizes storage.

FIG. 5 illustrates an example of an application 502 which runs on a host (e.g., application 133 in host 1 of FIG. 1) and utilizes storage 504, which may be in the form of LDEVs (e.g., logical device 31 in FIG. 2).

Figure 6:
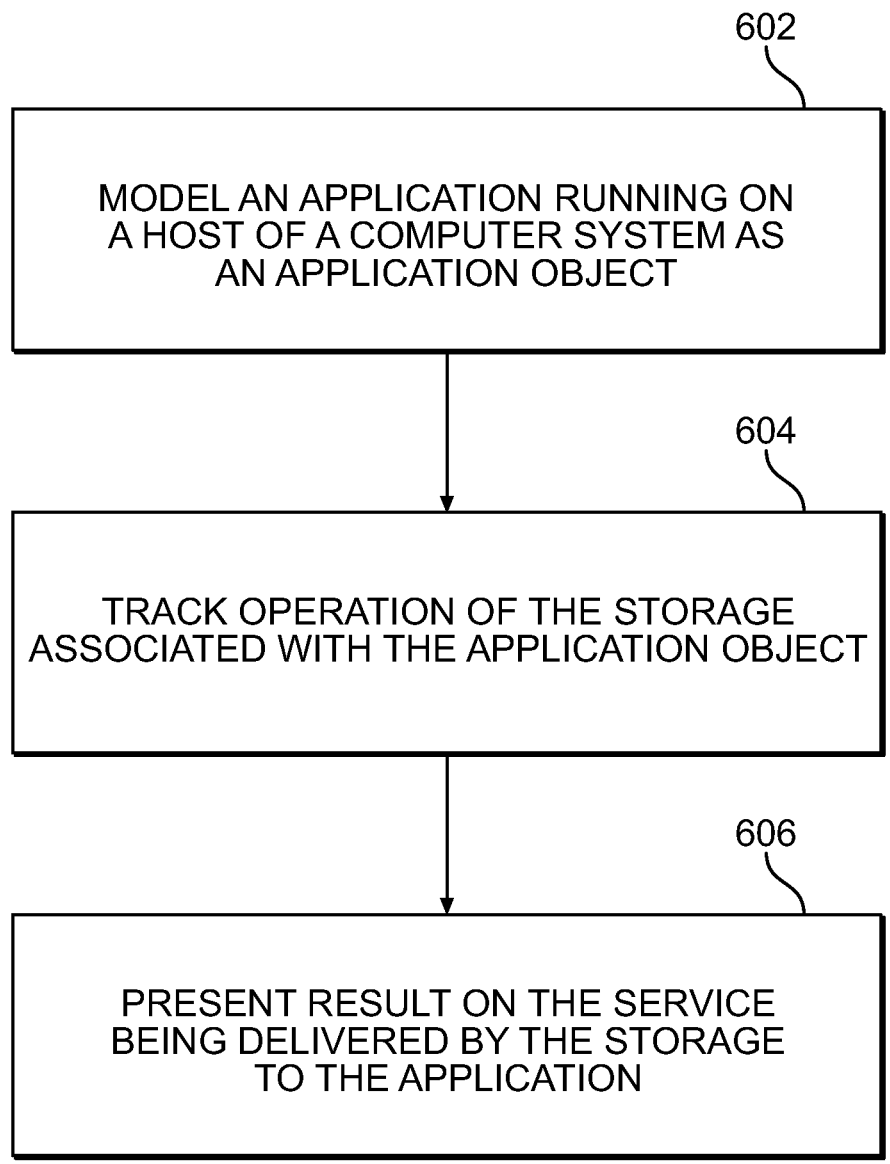
FIG. 6 illustrates an example of a flow diagram of modeling an application and the storage used thereby.

FIG. 6 illustrates an example of a flow diagram of modeling an application and the storage used thereby. The application modeling and tracking software can be stored in a memory and executed by a processor as a module, such as the memory and processor on a host or a separate management computer. In step 602, the application running on the host is modeled as an application object. It includes assigning and mapping the storage to the application. The application's storage may be assigned manually by the user or imported from storage groups of a device manager (e.g., device manager 231 in FIG.

1) in the computer system, such as an HDvM. If a configuration change occurs in the computer system (e.g., reconfiguration or reallocation of storage resources), the system preferably updates automatically the application object by mapping updated storage to the application.

In step 604, the storage (e.g., LDEVS) used by the actual application can be tracked as a service being delivered by the storage to the application in the storage management scheme of the invention by associating them with the application object. Examples of tracking the operation of the storage include monitoring which storage volume is used by the application, monitoring how much storage capacity is used by the application, monitoring storage usage trend of the storage used by the application, monitoring application storage service level objective (SLO) fulfillment, monitoring application SLO fulfillment trend, and the like.

In step 606, the program presents result on the service being delivered by the storage to the application based on tracking the operation of the storage. In contrast to existing technology, an explicit application object allows reporting on the operation of the actual application and on how well the storage is enabling the application rather than reporting on and troubleshooting storage without the context of an application. Furthermore, it enables reporting on the configuration of the storage for any application. Examples of presenting result on the service being delivered by the storage to the application include reporting on storage capacity of the storage used by the application, reporting on storage usage trend of the storage used by the application, reporting on a type of the storage used by the application, reporting on application storage service level objective (SLO) fulfillment of the application, reporting on application SLO fulfillment trend of the application, correlating degradation storage performance of the storage to performance of the application, correlating storage malfunction of the storage to effect of the storage malfunction on up/down-time of the application, predicting risk of application performance degradation/downtime of the application based on status of the storage currently assigned to the application, or assessing compliance of the application to preset standards in areas selected from the group consisting of multipathing, backup, and replication.

These types of reports can be used not only for chargeback, but for determining whether the application needs to be moved to a different type of storage which can deliver the types of service that the application requires.

B. Monitoring Application Service Level Objectives

Figure 7:
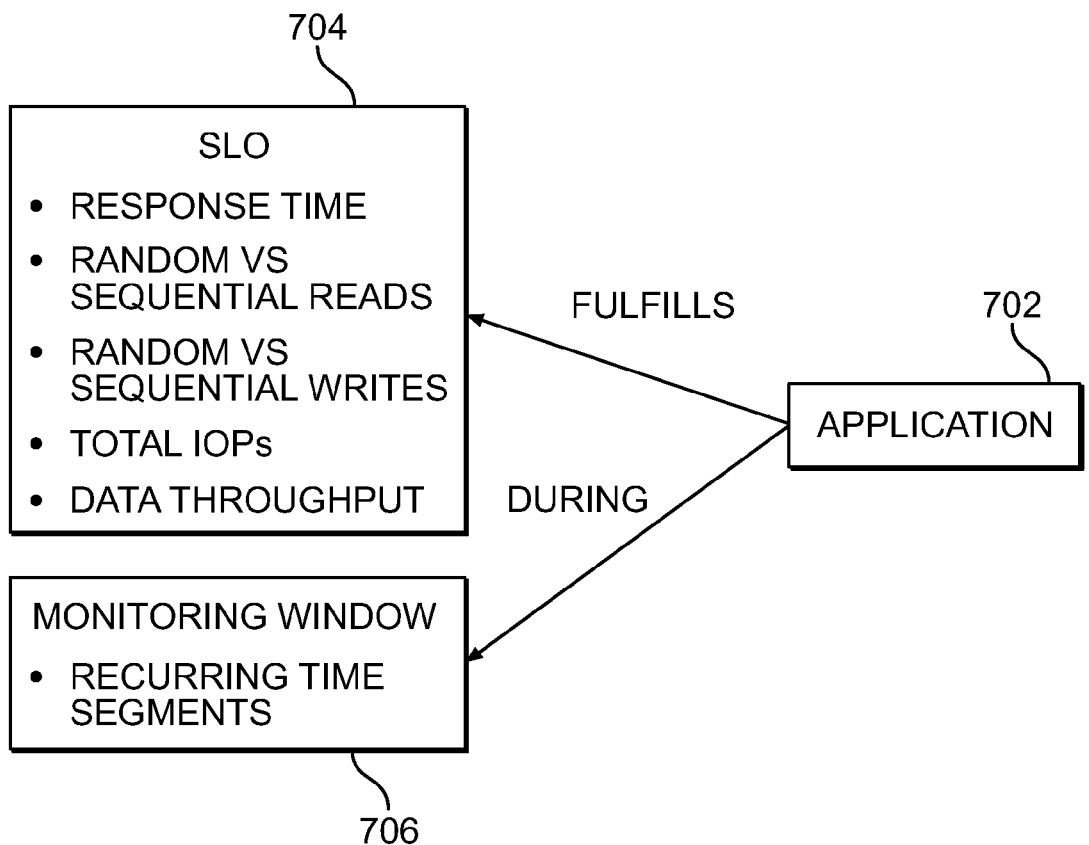
FIG. 7 illustrates an example of an application which utilizes storage and is managed with service level objects.

FIG. 7 illustrates an example of an application 702 which utilizes storage and is managed with application-based storage service level objects (SLOs) 704 for the storage utilized by the application 702. A monitoring window 706 is provided to monitor the SLOs 704. The monitoring may occur in recurring time segments. As discussed below, the user may be alerted when any of the SLOs 704 is violated.

Figure 8:
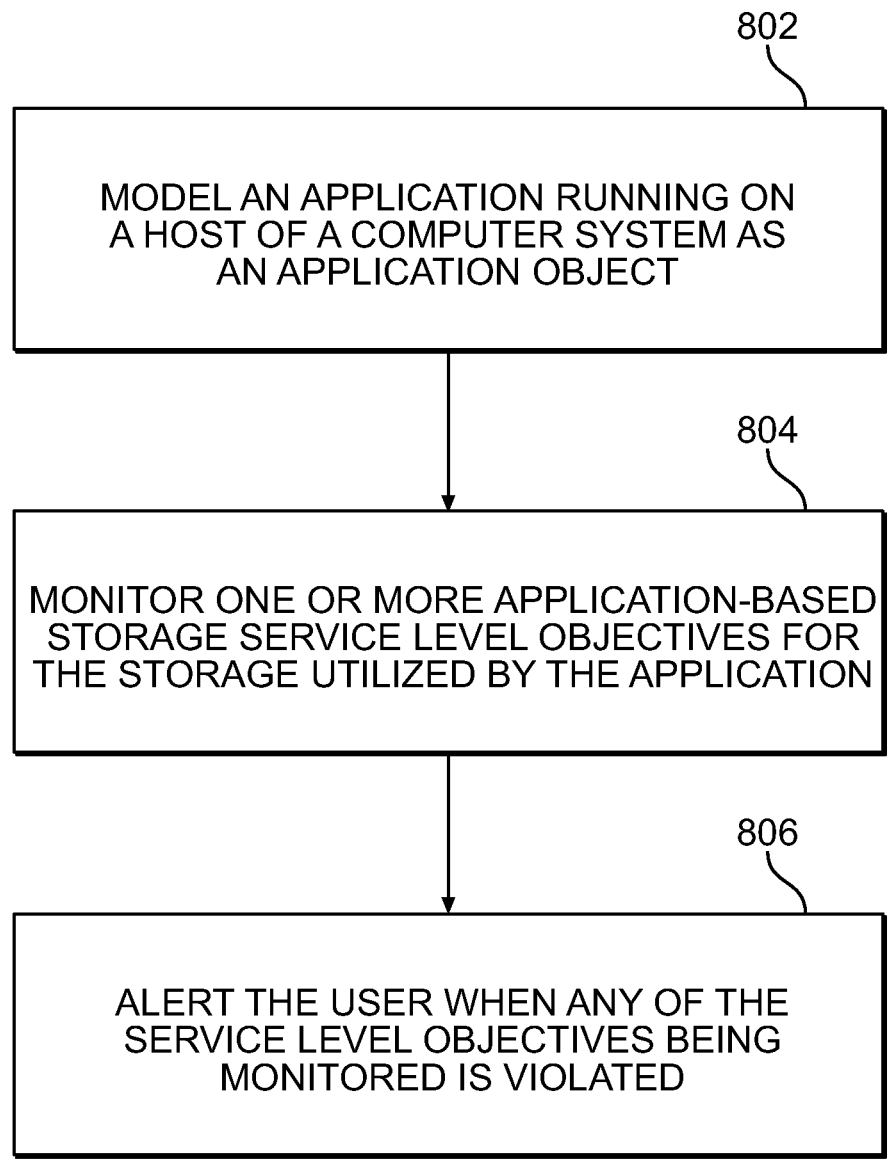
FIG. 8 illustrates an example of a flow diagram of managing a computer system having an application running on a host and utilizing storage.

FIG. 8 illustrates an example of a flow diagram of managing a computer system having an application running on a host and utilizing storage. The application modeling and storage service monitoring software can be stored in a memory and executed by a processor as a module, such as the memory and processor on a host or a separate management computer. In step 802, an application running on a host of a computer system is modeled as an application object, which includes associating storage utilized by the application with the application object. This may involve assigning and mapping the storage to the application. In step 804, one or more application-based storage service level objectives for the storage utilized by the application are monitored. Each service level objective is defined by a user to be threshold specific to the application. In step 806, the user is alerted when any of the one or more service level objectives being monitored is violated. If a configuration change occurs in the computer system (e.g., reconfiguration or reallocation of storage resources), the system preferably updates automatically the application object by mapping updated storage to the application.

Service level objects (SLOs) are set as thresholds on the behavior of an application's storage which must be met in order to ensure desired application function and performance. An SLO measures some storage characteristics such as response time, IOPS (input/output operations per second), random reads, random writes, sequential reads, sequential writes, cache hits, availability, active paths, and synced replicas. An SLO for a storage service may be, for example, "the response time will not exceed 2 seconds for 95% of the transactions." In a specific embodiment, there are two thresholds: yellow and red. If the yellow threshold is exceeded but not the red threshold, the SLO is in danger of being violated. If the red threshold is exceeded, the SLO is violated. In the above example, the yellow threshold may be "2 seconds for 90% of the transactions" and the red threshold may be "2 seconds for 95% of the transactions." Depending on the setting of these thresholds, their violation increases the risk of degradation of an application's response time, throughput, or availability.

Monitoring application SLOs provides the storage administrator with a tool for ensuring that all applications are functioning optimally. The storage administrator can set the SLOs with thresholds in order to represent accurately an application's function and performance. The storage administrator is warned with alerts to take proactive action when the storage is not delivering the expected level of service an application. Based on the quantitative evaluation of the service being delivered by the storage to the application, the storage administrator can proactively plan the application's storage allocation when its performance profile changes or its capacity needs increase. The quantitative evaluation of service includes at least one of availability, reliability, throughput, or transaction response time. Furthermore, monitoring application-based storage SLOs provides information on whether the customer's application's SLO has or has not been met. For example, the storage administrator will be able to prove that the application's storage was up a desired percentage of the time and delivered the desired level of performance to the application.

C. Flexible Reporting with Business Views

Figure 9:
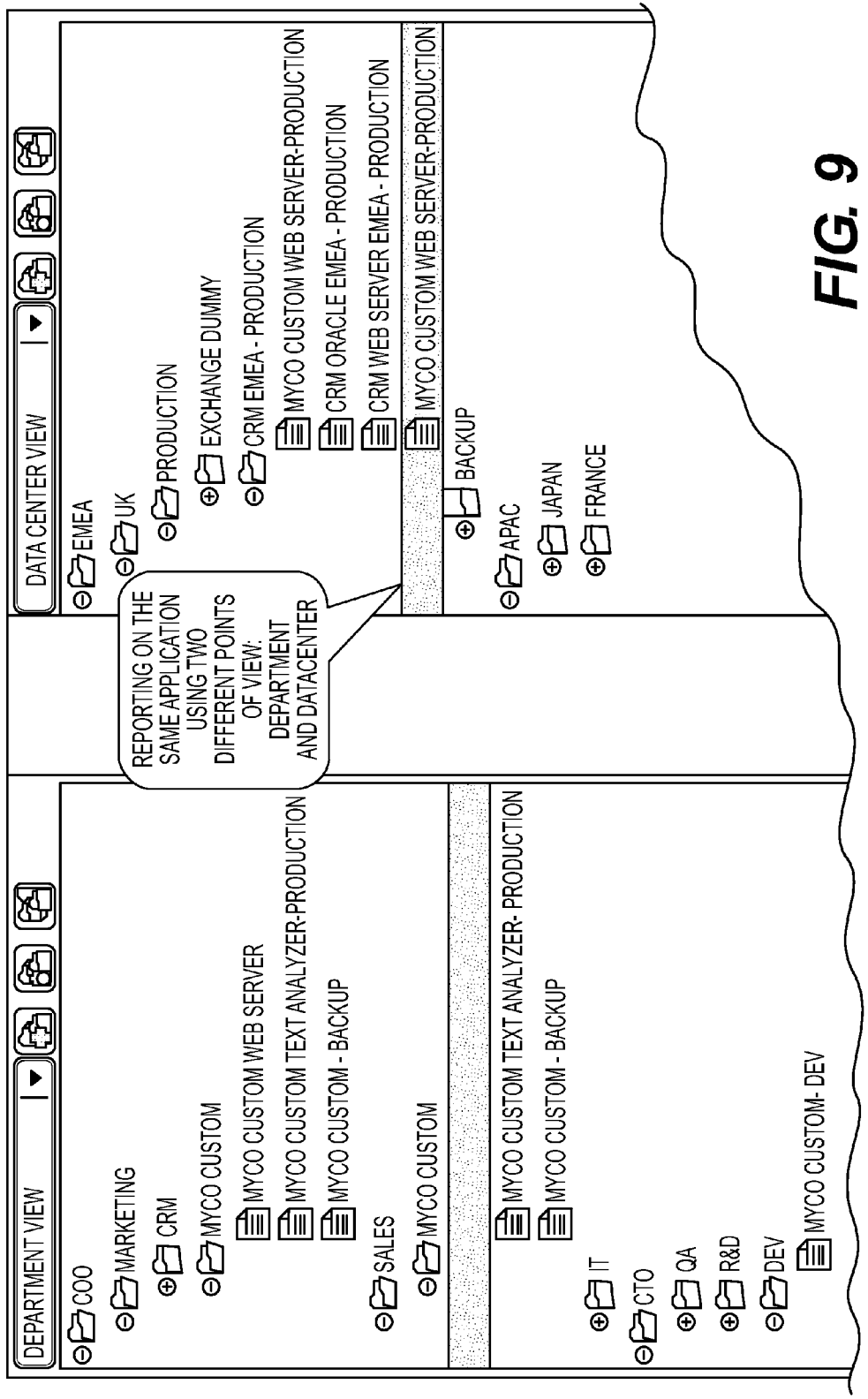
FIG. 9 illustrates an example of business views for aggregating application storage characteristics according to a reporting structure.

FIG. 9 illustrates an example of business views for aggregating application storage characteristics according to a reporting structure. FIG. 9 shows two business views: a Department view and a Data Center view. In each business view, a hierarchical folder structure of applications and folders is displayed. One folder may contain one or more applications and/or one or more folders. For example, in the Department view, the COO folder contains the Marketing folder, the Sales folder, and the IT folder. The Marketing folder contains the CRM folder and the MyCo Custom folder. The MyCo Custom folder contains the MyCo Custom Web Server application, the MyCo Custom Text Analyzer-Production application, and the MyCo Custom-Backup application. In the Data Center view, the EMEA folder contains the UK folder, which contains the Production folder, which contains the Exchange Dummy folder and the CRM EMEA-Production folder, which contains the CRM Oracle EMEA-Production application, the CRM Web Server EMEA-Production application, and the CRM Web Server EMEA-Production application. These hierarchical structures or trees are defined by the user to represent the selected types flexibly in the business views. It is possible to report on the same application (e.g., MyCo Custom Web Server-Production) using two different points of view under the Department view and the Data Center view in FIG. 9. The folders and applications in the hierarchical structure are referred to as "nodes" herein.

Business views allow the user to aggregate any report characteristic according to a flexible custom hierarchical structure without having to modify the actual report. Business views are hierarchical folder structures where folders can contain other folders and/or applications. Applications actually contain the storage they are using. Different business views can contain the same applications. The same reports (e.g. storage utilization report) are generated for every folder and application in every tree. In the examples above, the same applications are grouped in two different business views (Data Center view and Department view) according to the data centers where they are hosted and the departments that are using them. Thus it is easy to generate a summary of how much storage (as well as the kind of storage) is used by each department and data center in the company. Another example of a business view is an Application Type view. The reporting structure used to aggregate storage capacity is completely defined by the business view structure while storage characteristics, such as capacity, are captured by the reports which do not have to be modified to generate company organization-specific summaries. Any number of custom business views can be used to aggregate storage capacity utilization, performance, and availability reports of interest to a company without modifying the columns and rows of the corresponding capacity utilization, performance, and availability reports.

Figure 10:
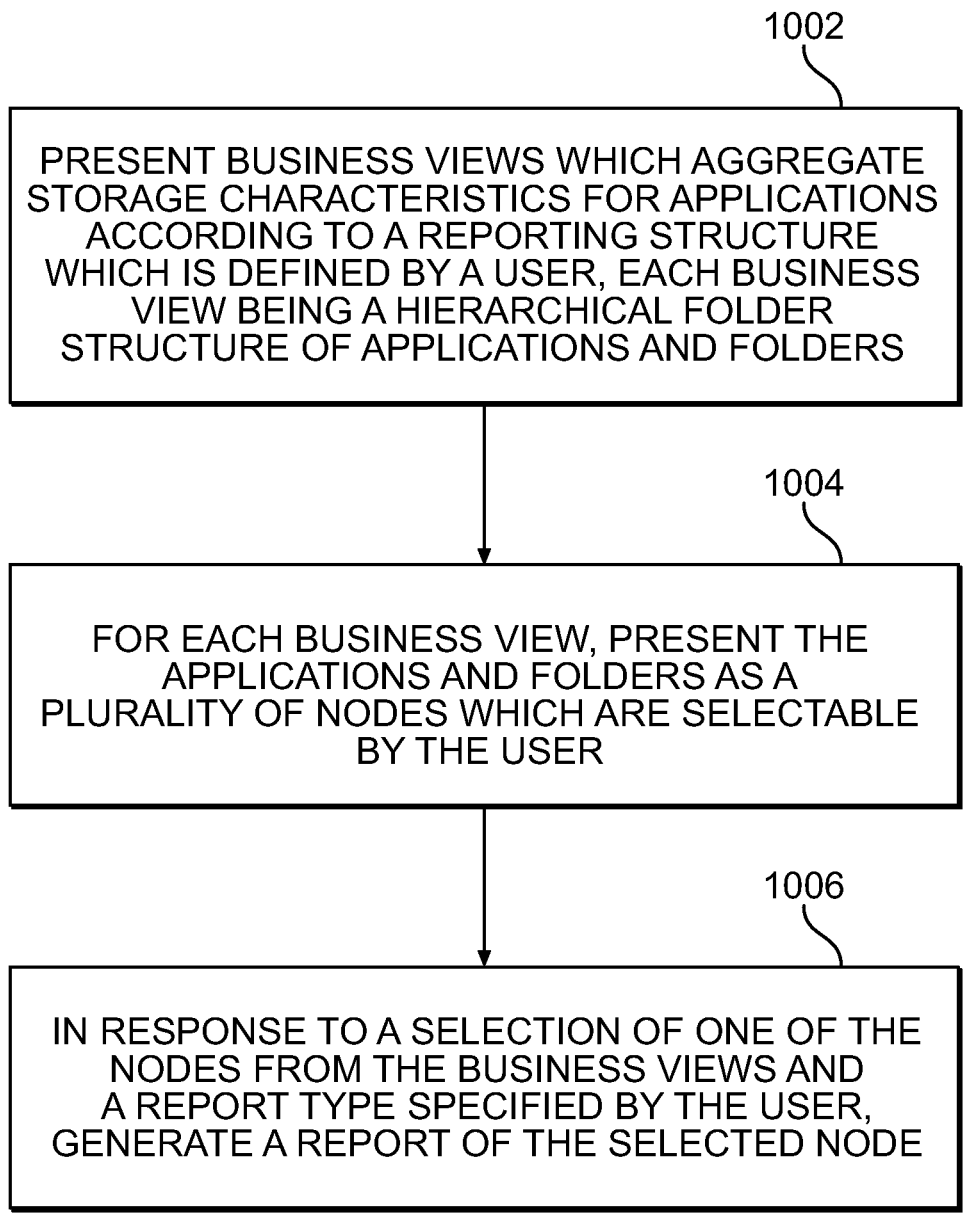
FIG. 10 illustrates an example of a flow diagram of flexible reporting for applications utilizing storage.

FIG. 10 illustrates an example of a flow diagram of flexible reporting for applications utilizing storage. The flexible reporting software can be stored in a memory and executed by a processor as a module, such as the memory and processor on a host or a separate management computer. In step 1002, a plurality of business views are presented which aggregate application storage characteristics for a plurality of applications according to a reporting structure which is defined by a user. Each of the business views is a hierarchical folder structure of the applications and a plurality of folders. At least one folder in the hierarchical folder structure contains at least one of an application or another folder. For each of the business views, the applications and folders are presented as a plurality of nodes which are selectable by the user in step 1004. In response to a selection of one of the nodes from the plurality of business views and a report type specified by the user, the program generates a report based on the report type of the selected node in step 1006. The report aggregates any of the application storage characteristics for the selected node according to the report type.

The application storage characteristics may include application storage capacity utilization, application storage performance, application storage I/O bandwidth usage, application storage service level objective (SLO) fulfillment, application SLO fulfillment trend, or the like. The business views may include folders that belong to at least one of categories of geographical locations of data center, departments of an organization, or application types. Each of the applications may contain the storage used thereby. The program may present a list of available report types to the user for the user to select the report type for the report to be generated (e.g., by presenting a drop-down menu). The available report types are customizable by the user. The available report types are designed to provide information for chargeback for storage usage, real-location of storage, storage planning, or the like.

Unlike the present invention, existing storage reporting products would require the definition of a customized report to aggregate storage capacity utilization for each company organizational structure. Additionally, existing products do not offer the ability to aggregate storage characteristics other than capacity such as SLO fulfillment and performance. In the present invention, business views comprise an aggregation technology which can be used to aggregate any storage metric.

The flexible reporting scheme has various uses. Some of the more important uses are to aggregate storage capacity used by any application(s), tier, or folder(s) within a business view for chargeback or planning purposes; to aggregate storage I/O bandwidth used by any application(s) or folder(s) within a business view for chargeback or planning purposes; to aggregate storage SLO fulfillment for any application(s) or folder(s) within a business view for chargeback or planning purposes; and to aggregate storage SLO fulfillment trends for any application(s) or folder(s) within a business view for measuring and improving the storage administrator's process improvement over time.

The flexible reporting scheme using business views described above is not merely organizing objects (i.e., applications) into hierarchical structures. Rather, the scheme focuses on reporting on the application(s), not on organizing them. As discussed above, a given application can reside in multiple hierarchical structures presented as business views. Each hierarchical structure is a single column of data (i.e., dimension in OLAP terms) with specific values of interest selected (i.e., nodes in the hierarchical structure) for flexible reporting thereof. This hierarchical structure serves as a reporting model in an OLAP sense. The user defines the reporting structure according to which a plurality of business views which aggregate application storage characteristics for a plurality of applications are presented.

The flexible reporting scheme provides comprehensive reporting of the storage environments by enabling the user to easily group storage resources by hosts, applications, and business unit perspectives. The user can merge and interpret management data from across the suite of storage products in the system and thereby tune the storage systems for optimal performance. With centralized reporting of both storage configuration and performance, an organization can easily align its storage assets with critical business applications while simplifying the correlation of application-to-storage reporting. In addition, the application storage management scheme by tracking the operation of the storage associated with the applications and monitoring application-based storage SLOs facilitates the rapid modification of the storage environment for changing business requirements.

One benefit of the invention is the easy alignment of storage assets with business functions by simplifying the organization and correlation of storage assets to applications and their respective business functions, and by customizing business views of applications and their respective storage resources for chargeback accounting purposes and to address specific reporting needs.

Another benefit is the improved utilization of storage assets by correlating the reporting of storage capacity allocations with critical business applications to minimize unnecessary storage purchases and improve return on storage investments, and by providing reporting on current and historical storage performance by applications, business functions, and storage tiers to improve future storage planning.

The invention also allows the user or administrator to monitor business applications for adherence to storage SLOs by proactively monitoring compliance of storage SLOs for mission critical business applications, and by providing reporting of key storage performance indicators and any non-compliance to established SLOs.

The invention further provides the user or administrator with the tools to detect problems early to avoid storage performance bottlenecks by monitoring overall storage system health based on best practice rules to detect problems early and reduce the likelihood of any downtime, and by providing a consolidated view of the storage environment by aggregating key performance indicators from across the suite of storage products in the system.

Of course, the system configurations illustrated in FIGS. 1-3 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for modeling an application and the storage used thereby, for managing a computer system having an application running on a host and utilizing storage, and for flexible reporting for applications utilizing storage. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A non-transitory computer-readable storage medium storing a plurality of instructions for controlling a data processor to provide reporting for storage used by a plurality of applications running on a host computer, the plurality of instructions comprising:

instructions that cause the data processor to present at least first and second types of business views which aggregate application storage characteristics for a plurality of applications according to a reporting structure which is defined by a user, the first type of business view comprising a first type of hierarchical folder structure including information of the plurality of applications, and the second type of business view comprising a second type of hierarchical folder structure which is different from the first type of hierarchical folder structure, the second type of hierarchical folder structure including the information of the plurality of applications;

instructions that, for each of the business views, present the applications and folders as a plurality of nodes which are selectable by the user;

instructions that, in response to a selection of a first node from the first business view and a report type specified by the user, generate a report based on the report type of the first node, the report aggregating any of the application storage characteristics of applications in the first node for the first node according to the report type, the applications in the first node including a first application; and instructions that, in response to a selection of a second node from the second business view and a report type specified by the user, generate a report based on the report type of the second node, the report aggregating any of the application storage characteristics of applications in the second node for the second node according to the report type, the applications in the second node including the first application and a second application, wherein the second application is not included in the first node, wherein the application storage characteristics of the first application and the application storage characteristics of other applications in the first node are aggregated for the first node without aggregation of the application storage characteristics of the second application for the first node, and the application storage characteristics of the first application and the application storage characteristics of other applications, which includes the second application, in the second node are separately aggregated for the second node.

2. The non-transitory computer-readable storage medium of claim 1, wherein the application storage characteristics include at least one of application storage capacity utilization, application storage performance, application storage I/O bandwidth usage, application storage service level objective (SLO) fulfillment, or application SLO fulfillment trend.

3. The non-transitory computer-readable storage medium of claim 1,
wherein the business views include folders that belong to at least one of categories of geographical locations of data center, departments of an organization, or application types.

4. The non-transitory computer-readable storage medium of claim 1, wherein the plurality of instructions further comprise:
instructions that cause the data processor to present a list of available report types to the user for the user to select the report type for the report to be generated.

5. The non-transitory computer-readable storage medium of claim 4,
wherein the available report types are customizable by the user.

6. The non-transitory computer-readable storage medium of claim 4,
wherein the available report types are designed to provide information for at least one of chargeback for storage usage, reallocation of storage, or storage planning.

7. A management computer coupled to a storage system whose storage is used by a plurality of applications running on at least one computer, the management computer comprising:
a memory being configured to store a computer program;
a processor, by executing the computer program, being configured to:
present at least first and second types of business views, the first type of business view comprising a first type of hierarchical folder structure including information of the plurality of applications, and the second type of business view comprising a second type of hierarchical folder structure which is different from the first type of hierarchical folder structure, the second type of hierarchical folder structure including the information of the plurality of applications;
report information aggregating a particular type of storage characteristic of applications in a first folder for the first folder selected by a user from the first business view, applications in the first folder including a first application; and
report information aggregating the particular type of storage characteristic of applications in a second folder for the second folder selected by a user from the second business view, applications in the second folder including the first application and a second application, wherein the second application is not included in the first folder,
wherein the particular type of storage characteristic of the first application and the particular type of storage characteristic of other applications in the first folder are aggregated for the first folder without aggregation of the particular type of storage characteristic of the second application for the first folder, and the particular type of storage characteristic of the first application and the particular type of storage characteristic of other applications, which includes the second application, in the second folder are separately aggregated for the second folder.

8. The management computer of claim 7,
wherein the particular type of storage characteristic for applications include at least one of application storage capacity utilization, application storage performance, application storage I/O bandwidth usage, application storage service level objective (SLO) fulfillment, or application SLO fulfillment trend.

9. The management computer of claim 7,
wherein the business views include folders that belong to at least one of categories of geographical locations of data center, departments of an organization, or application types.

10. The management computer of claim 7, wherein the processor is further configured to:
present a list of available report types to the user for the user to select the report type for the report.

11. The management computer of claim 10,
wherein the available report types are customizable by the user.

12. The management computer of claim 10,
wherein the available report types are designed to provide information for at least one of chargeback for storage usage, reallocation of storage, or storage planning.

13. In a computer system which includes at least one computer and at least one storage system which are connected via a network, the at least one computer having one or more applications running thereon, a method for providing reporting for storage in the at least one storage system, the storage used by the one or more applications, the method comprising:
presenting at least first and second types of business views, the first type of business view comprising a first type of hierarchical folder structure including information of a plurality of applications, and the second type of business view comprising a second type of hierarchical folder structure which is different from the first type of hierarchical folder structure, the second type of hierarchical folder structure including the information of the plurality of applications;
reporting information aggregating a particular type of storage characteristic of applications in a first folder for the first folder selected by a user from the first business view, applications in the first folder including a first application; and
reporting information aggregating the particular type of storage characteristic of applications in a second folder for the second folder selected by a user from the second business view, the applications in the second folder including the first application and a second application, wherein the second application is not included in the first folder,
wherein the particular type of storage characteristic of the first application and the particular type of storage characteristic of other applications in the first folder are aggregated for the first folder without aggregation of the particular type of storage characteristic of the second application for the first folder, and the particular type of storage characteristic of the first application and the particular type of storage characteristic of other applications, which includes the second application, in the second folder are separately aggregated for the second folder.

14. The method of claim 13,
wherein the particular type of storage characteristic for applications include at least one of application storage capacity utilization, application storage performance, application storage I/O bandwidth usage, application storage service level objective (SLO) fulfillment, or application SLO fulfillment trend.

15. The method of claim 13,
wherein the business views include folders that belong to at least one of categories of geographical locations of data center, departments of an organization, or application types.

16. The method of claim 13, further comprising:
presenting a list of available report types to the user for the user to select the report type for the report.

17. The method of claim 16,
wherein the available report types are customizable by the user.

18. The method of claim 16,
wherein the available report types are designed to provide information for at least one of chargeback for storage usage, reallocation of storage, or storage planning.

19. A computer system including at least one computer and at least one storage system which are connected via a network, the at least one computer having one or more applications running thereon and utilizing storage in the at least one storage system, the computer system further including a reporting module which:
presents at least first and second types of business views, the first type of business view comprising a first type of hierarchical folder structure including information of a plurality of applications, and the second type of business view comprising a second type of hierarchical folder structure which is different from the first type of hierarchical folder structure, the second type of hierarchical folder structure including the information of the plurality of applications;
reports information aggregating a particular type of storage characteristic of applications in a first folder for the first folder selected by a user from the first business view, the applications in the first folder including a first application; and
reports information aggregating the particular type of storage characteristic of applications in a second folder for the second folder selected by a user from the second business view, the applications in the second folder including the first application and a second application, wherein the second application is not included in the first folder,
wherein the particular type of storage characteristic of the first application and the particular type of storage characteristic of other applications in the first folder are aggregated for the first folder without aggregation of the particular type of storage characteristic of the second application for the first folder, and the particular type of storage characteristic of the first application and the particular type of storage characteristic of other applications, which includes the second application, in the second folder are separately aggregated for the second folder.

20. The computer system of claim 19,
wherein the particular type of storage characteristic for applications include at least one of application storage capacity utilization, application storage performance, application storage I/O bandwidth usage, application storage service level objective (SLO) fulfillment, or application SLO fulfillment trend.

21. The computer system of claim 19,
wherein the business views include folders that belong to at least one of categories of geographical locations of data center, departments of an organization, or application types.

22. The computer system of claim 19, wherein the reporting module:
presents a list of available report types to the user for the user to select the report type for the report.

23. The computer system of claim 22,
wherein the available report types are customizable by the user.

24. The computer system of claim 22,
wherein the available report types are designed to provide information for at least one of chargeback for storage usage, reallocation of storage, or storage planning.

* * * * *